(12) United States Patent
Chailertborisuth

(10) Patent No.: US 11,159,122 B2
(45) Date of Patent: Oct. 26, 2021

(54) APPARATUS FOR CHARGING A HANDHELD COMPUTING DEVICE

(71) Applicant: Ravi Chailertborisuth, Bangkok (TH)

(72) Inventor: Ravi Chailertborisuth, Bangkok (TH)

(*) Notice: Subject to any disclaimer, the term of this patent is extended or adjusted under 35 U.S.C. 154(b) by 115 days.

(21) Appl. No.: 16/448,001

(22) Filed: Jun. 21, 2019

(65) Prior Publication Data

US 2019/0393835 A1 Dec. 26, 2019

Related U.S. Application Data

(60) Provisional application No. 62/687,923, filed on Jun. 21, 2018.

(51) Int. Cl.

| | |
|---|---|
| *H02S 40/38* | (2014.01) |
| *H02J 7/35* | (2006.01) |
| *H02J 7/00* | (2006.01) |
| *H02J 7/02* | (2016.01) |
| *H02J 50/10* | (2016.01) |

(52) U.S. Cl.
CPC ............ *H02S 40/38* (2014.12); *H02J 7/0042* (2013.01); *H02J 7/025* (2013.01); *H02J 7/35* (2013.01); *H02J 50/10* (2016.02)

(58) Field of Classification Search
CPC ... H02S 40/38; H02J 50/10; H02J 7/00; H02J 7/02; H02J 7/35; H02J 7/0042; H02J 7/025; H02J 2207/40; Y02E 10/56; Y02E 70/30

See application file for complete search history.

(56) References Cited

U.S. PATENT DOCUMENTS

| | | | |
|---|---|---|---|
| 2013/0201641 A1* | 8/2013 | Soden | B60L 53/68 361/752 |
| 2014/0111135 A1* | 4/2014 | Idzik | H01L 31/022425 320/101 |
| 2014/0292260 A1* | 10/2014 | Dyer | B60L 53/53 320/107 |
| 2016/0233687 A1* | 8/2016 | McKernan | B66F 9/24 |
| 2016/0295095 A1* | 10/2016 | Jannard | G03B 17/00 |
| 2017/0090530 A1* | 3/2017 | Filser | G06F 1/1632 |
| 2017/0215293 A1* | 7/2017 | Merenda | A45C 13/02 |
| 2017/0222450 A1* | 8/2017 | Lee | H02J 7/00 |
| 2018/0259914 A1* | 9/2018 | Chae | G04G 19/00 |
| 2019/0190564 A1* | 6/2019 | Cook | H04W 16/26 |

* cited by examiner

*Primary Examiner* — Naishadh N Desai
(74) *Attorney, Agent, or Firm* — Jacob Ong; Ongs Law Firm PLLC

(57) ABSTRACT

An apparatus for charging a handheld computing device is described. The apparatus includes a case, a power storage device, a photovoltaic power source, a charging device, a communication module, and a data connection port. The case is sized to hold a handheld computing device. The power storage device is mechanically connected to the case. The photovoltaic power source is connected to the power storage device. The charging device is electrically connected to the power storage device to charge the handheld computing device. The communication module communicates with the handheld computing device. The data connection port provides data access for the handheld computing device using the communication module.

3 Claims, 10 Drawing Sheets

APPARATUS FOR CHARGING A HANDHELD COMPUTING DEVICE

TECHNICAL FIELD

The disclosure relates generally to an apparatus for charging a mobile computing device. Specifically, the disclosure relates to a mobile apparatus for charging a mobile computing device while providing auxiliary functionality.

BACKGROUND

Mobile computing devices have proliferated in society. Many individuals rely on mobile computing devices, such as cell phones, to operate their businesses and their lives. These devices provide access to information and data, such as internet connectivity, telephone access, and data storage. These devices play an important role in the lives of their users.

These devices, however, are subject to limitations. A device may be fragile and prone to breakage. A device may have limited electrical storage capacity. A device may have a battery that has chemical limitations, reducing the use time and computing power of the device.

Additionally, devices may lack functionality a user desires, such as audio ports or data ports.

BRIEF SUMMARY

An apparatus for charging a handheld computing device is disclosed. The apparatus may include a case, a power storage device, a photovoltaic power source, a charging device, a communication module, and a data connection port. The case may be sized to hold a handheld computing device. The power storage device may be mechanically connected to the case. The photovoltaic power source may be mechanically connected to the case and may be electrically connected to the power storage device. The charging device may be electrically connected to the power storage device. The charging device may be configured to charge the handheld computing device. The charging device may charge the handheld computing device. The communication module may be configured to communicate with the handheld computing device. The communication module may communicate with the handheld computing device. The data connection port may provide data access for the handheld computing device using the communication module.

BRIEF DESCRIPTION OF THE DRAWINGS

A more particular description of the invention briefly described above is made below by reference to specific examples. Several examples are depicted in drawings included with this application. An example is presented to illustrate, but not restrict, the invention.

DETAILED DESCRIPTION

Figure 1:
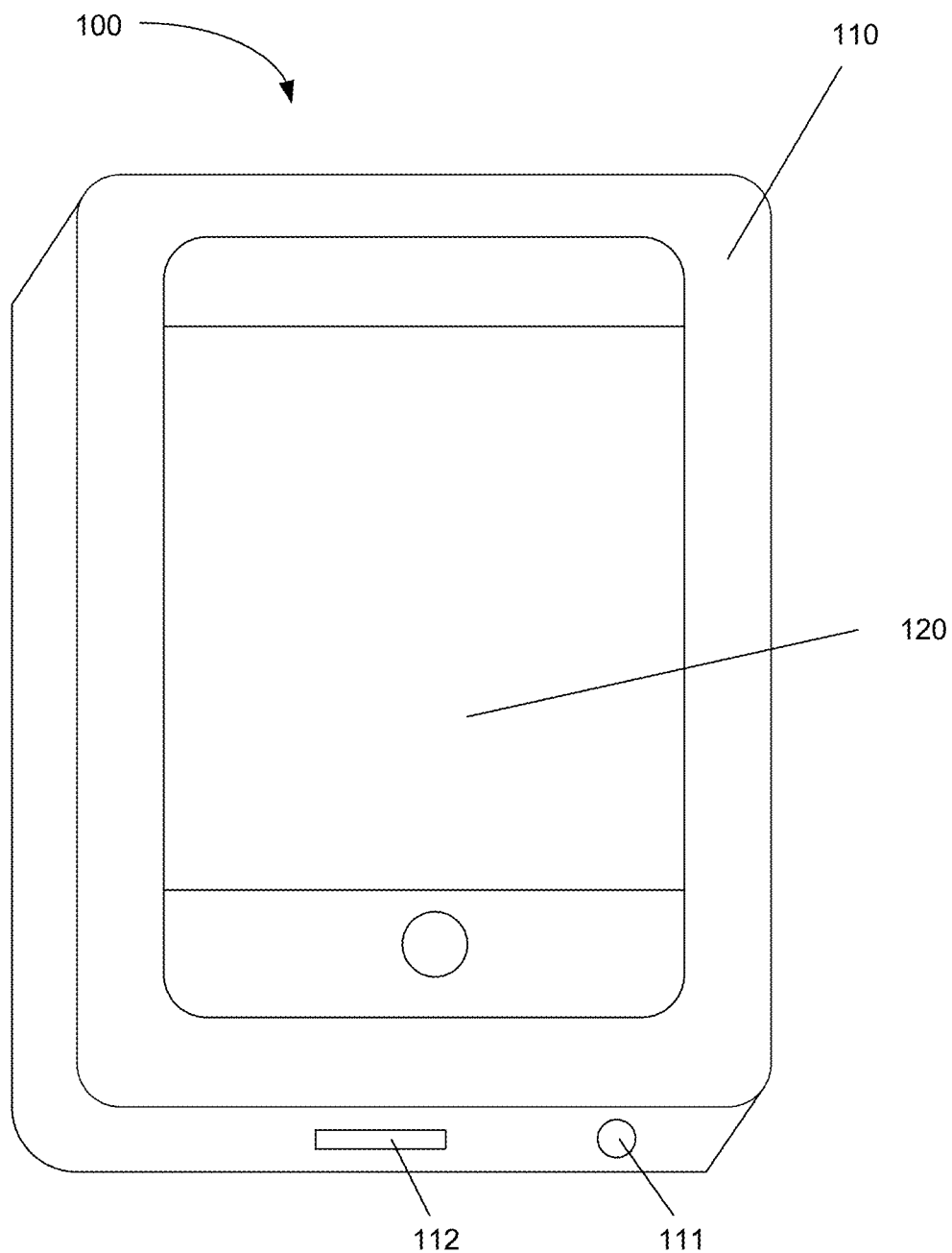
FIG. 1 illustrates a front view of an apparatus for charging a handheld computing device with a handheld computing device.

A detailed description of the claimed invention is provided below by example, with reference to examples in the appended figures. Those of skill in the art will recognize that the components and steps of the invention as described by example in the figures below could be arranged and designed in a wide variety of different configurations, without departing from the substance of the claimed invention. Thus, the detailed description of the examples in the figures is merely representative of an example of the invention, and is not intended to limit the scope of the invention as claimed.

In some instances, numerical values are used to describe features such as spreading factors, output power, bandwidths, link budgets, data rates, and distances. Though precise numbers are used, one of skill in the art recognizes that small variations in the precisely stated values do not substantially alter the function of the feature being described. In some cases, a variation of up to 50% of the stated value does not alter the function of the feature. Thus, unless otherwise stated, precisely stated values should be read as the stated number, plus or minus a standard variation common and acceptable in the art.

For purposes of this disclosure, any reference to "power" may be replaced or substituted with "energy." Any embodiment that uses or refers to "power" also refers to an alternative embodiment that uses or refers to "energy."

For purposes of this disclosure, a module refers to a combination of hardware and program instructions to perform a designated function. Each of the modules may include a processor and memory. The program instructions may be stored in the memory and may cause the processor to execute the designated function of the modules.

A purpose of the claimed apparatuses, methods, and systems may be to facilitate and enhance the use of a handheld computing device. One example is an apparatus for charging a handheld computing device includes a case to protect the device, a battery for power storage, a photovoltaic power supply to charge the battery, a charging device to charge the handheld computing device using electrical induction, a communication module to communicate with the handheld computing device and receive audio output, and a data connection port for audio headphones. Another example is an apparatus for charging a handheld computing device that includes a case to protect the device, a battery for power storage, a photovoltaic power supply to charge the battery. Another example is an apparatus that is hinged to allow the handheld computing device to be charged by the photovoltaic power source. In another example, a charging device may be configured to charge the handheld computing device using electrical induction, and the apparatus may have a communication module to communicate with the handheld computing device and receive audio output, and the apparatus may have a data connection port for audio headphones.

As used in the present specification and in the appended claims, the term universal serial bus (USB) refers to any connector for a universal serial bus device. A USB device may be of any generation such as USB 1.0, USB 2.0, USB 3.0, or subsequent revisions.

As used in the present specification and in the appended claims, the term data port refers to any connector to transmit or receive data communication, including but not limited to USB, FireWire (IEEE 1394), ExpressCard, eSATA (External Serial AT Attachment), Thunderbolt, VGA (Video Graphics Array) or other connectors used to transmit data between computing devices.

As used in the present specification and in the appended claims, the term audio output connector refers to any connector that may be used for audio input devices including, but not limited to, a 3.5 mm stereo headphone jack, a 3.5 mm mono headphone jack, a 6.35 mm audio jack, an RCA Coaxial jack, a BNC connector, a mini-DIN, or similar connector.

As used in the present specification and in the appended claims the term photovoltaic energy source refers to any device, apparatus, module, or system that derives energy from photovoltaic energy and converts it to electrical energy.

As used in the present specification and in the appended claims, the term a number refers to one or more of an item; zero not being a number, but rather, the absence of a number.

As used in the present specification and in the appended claims, the term a plurality refers to two or more of an item.

As used in the present specification and in the appended, the term communication refers to the imparting or exchange of information.

As described above, an apparatus for charging a handheld computing device may allow for both the support and augmentation of a handheld computing device. The apparatus may provide for protection for the handheld computing device. At the same time, the apparatus may provide an auxiliary power source for the handheld computing device. While connectors for handheld computing devices may vary, an inductance charger may allow for the handheld computing device to be charged without bearing the connector or requiring physical contact with the connector. Additionally, the apparatus may provide additional input or output connectors such as a data connector, a USB connector, and audio headphone connector, or other input or output connections. The apparatus may charge its own battery and the battery of the handheld computing device using photovoltaic energy panels or power sources.

Selecting and implementing a device that provides physical protection allows for an individual to protect an expensive handheld computing device while expressing their own personality. An individual that uses an apparatus for charging a handheld computing device may express their own personality, as well as receiving additional functionality for the device and additional use with the device. Such an individual may express that they are heavy users requiring additional power and connectivity beyond that which was intended by the handheld computing device manufacturer.

The apparatus includes an auxiliary power source to provide additional energy for the handheld computing device. The power source may provide multiple charges for the handheld computing device. The auxiliary power source may provide 3000 mA hours, sufficient for an entire charge of a handheld computing device. The auxiliary power source may provide for multiple charges of the handheld computing device.

The apparatus may use any of a number of methods for providing electrical power to the handheld computing device. For example, an inductive charger may charge the handheld computing device without an actual mechanical connection between the charger and the handheld computing device. In another example, the apparatus for charging a handheld computing device may include a connector specific to the handheld computing device for the apparatus.

A photovoltaic energy source may provide additional power to the auxiliary power source. The photovoltaic energy source may allow the apparatus for charging a handheld computer device to be recharged without being plugged in, or it may allow for additional energy to charge the device while the device is being charged.

The apparatus for charging a handheld computing device may include a communication module. The communication module may communicate with a handheld computing device to allow data access to the handheld computing device through a data port associated with the apparatus for charging the handheld computing device.

The apparatus for charging a handheld computing device includes a data connection port. The data connection port may provide data connectivity that is not included as part of the handheld computing device. For example, in some embodiments, a handheld computing device that does not have an audio output port may communicate with the apparatus for charging a handheld computing device and may use an audio output port that is part of the apparatus for charging a handheld computing device.

Referring now to the figures, FIG. 1 illustrates a handheld computing device system (100). The system may include an apparatus (110) for charging a handheld computing device and a handheld computing device (120). As shown, the apparatus (110) for charging a handheld computing device may include two data connection ports. In this example, the apparatus (110) for charging a handheld computing device may include a USB port (112) and an auxiliary headphone jack (111).

The handheld computing device (120) may be a cellular telephone, a mobile media device, or a tablet. The handheld computing device (120) may include a display. The handheld computing device (120) may include a number of input peripherals, such as buttons or a touchscreen. The handheld computing device (120) may include internal speakers or microphones. The handheld computing device (120) may be capable of wireless communication such as wireless network connectivity, cellular connectivity, or short range data connectivity such as Bluetooth™ connectivity. The handheld computing device (120) may use wireless connectivity to communicate with the apparatus (110) for charging the handheld computing device.

The apparatus (110) for charging the handheld computing device may use wireless connectivity to communicate with the handheld computing device (120). The apparatus (110) for charging the handheld computing device may use a data connection port to communicate with the handheld computing device. Communication between the apparatus (110) for charging the handheld computing device and the handheld computing device (120) may allow the handheld computing device to communicate with a number of data ports associated with the apparatus 110).

The apparatus (110) for charging the handheld computing device includes a number of data connectivity ports (111, 112). In this example, there are two data connectivity ports (111, 112). A 3.5 mm auxiliary headphone jack (111) allows a user of the handheld computing device to use devices dependent on the 3.5 mm auxiliary headphone jack connector. External headphones, speakers, or credit card reading devices may require the use of a 3.55 mm auxiliary headphone jack to communicate with the handheld computing device (120). The apparatus (110) for charging the handheld computing device may allow such devices to continue their use. The apparatus (110) for charging the handheld computing device may also be configured to communicatively couple for the operation of auxiliary devices that do not need their own power supply, such as a wireless speaker, a credit card transaction device, or other device that may depend on a handheld computing device for a power source.

Figure 2:
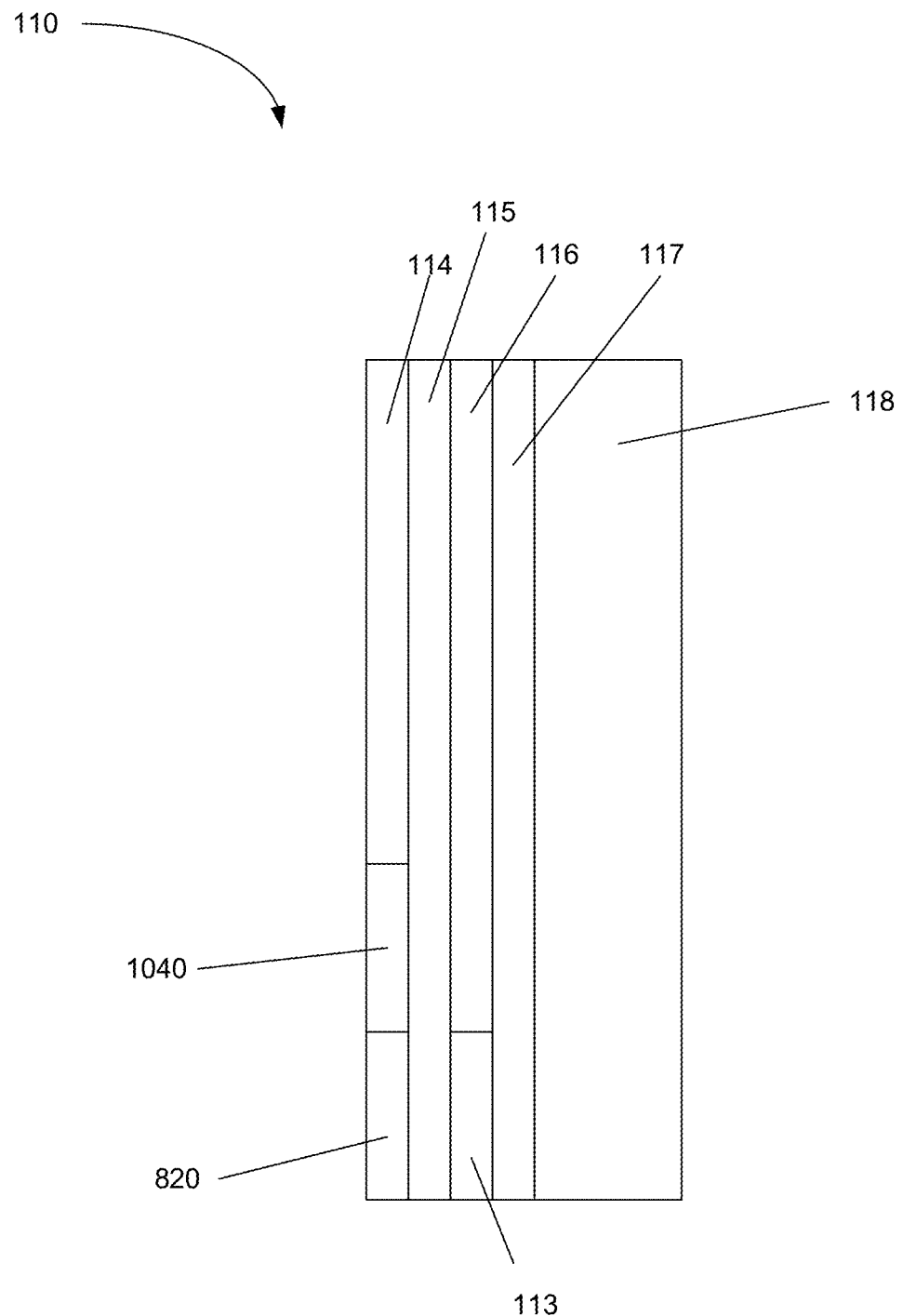
FIG. 2 illustrates a side view of an apparatus for charging a handheld computing device.

FIG. 2 illustrates a side view of an apparatus (110) for charging a handheld computing device. The apparatus may include a case (118), a charging device (117), the communication module (116), a power storage (115), a photovoltaic power source (114), a power management module (820), a Bluetooth control module (1040), and a number of data ports (113).

The case (118) may be shaped to hold and protect the handheld computing device (FIG. 1, 120). The case (118) may be constructed of any number of materials including plastic, polymers, alloys, or metals. The case (118) may include material to absorb or reduce the shock of movement to the handheld computing device (FIG. 1, 120). The case (118) may encompass the handheld computing device (FIG. 1, 120) or may only partially encompass the handheld computing device (FIG. 1, 120). The case (118) may include translucent protectors, such as a screen protector, that allow the handheld computing device (FIG. 1, 120) to be both viewed and used without removing the handheld computing device from the case.

The charging device (117) may provide an electrical connection between the apparatus (110) for charging the handheld computing device and the handheld computing device (FIG. 1, 120). The electrical connection may be achieved, using inductance, to transfer energy from power storage (115) to the handheld computing device. The electrical connection may be achieved using a physical connection to transfer energy from power storage (115) to the handheld computing device (FIG. 1, 120).

The communication module (116) may communicate between the apparatus (110) for charging a handheld computing device and the handheld computing device (FIG. 1, 120). The communication module (116) may use wireless technology to communicate with the handheld computing device (FIG. 1, 120). The communication module (116) may allow for both input and output to the handheld computing device (FIG. 1, 120). The communication module (116) may include instructions, either in software or hardware, to facilitate communication with a number of data connection ports (113). The communication module (116) may provide software drivers, such as device drivers or network drivers, to facilitate communication using the data connection port (113).

A power storage (115) may be associated with the apparatus (110) for charging a handheld computing device. The power storage source may include a battery, or a number of batteries, to provide electrical energy for the handheld computing device (FIG. 1, 120)

A photovoltaic power source (114) may provide the ability to charge, recharge, or supplement the power storage (115). Exposing the photovoltaic power source (114) to light may allow for the production of electrical energy to supply the power storage (115) which in turn may be used by the handheld computing device (FIG. 1, 110).

A power management module (820) may include circuitry or software to control the wired power input, wireless power input, and/or solar power input through a power management to create power production for a handheld computing device (FIG. 1, 120).

The apparatus may have a Bluetooth control module (1040); the Bluetooth control module (1040) provides power for a Bluetooth module to communicate audio input and output from an audio jack to a handheld computing device (FIG. 1, 120) through a Bluetooth antennae o a handheld computing device (FIG. 1, 120)

An overall example using FIG. 2 will now be given. A cellular telephone may be used as a handheld computing device (FIG. 1, 120) and placed in the case (118). The case may protect the cellular telephone from breakage due to being dropped or to other mechanical forces.

While in the case, the cellular telephone may be used and may cause the battery in the cellular telephone to consume energy. The charging device (117) may recharge a cellular telephone to permit longer use of the cellular telephone. In this example, the power management module may uses some energy from a solar power input, some energy from a wireless power input and some energy from a wired power input may be combined to provide sufficient amperage to the charging device (117) through induction to transfer energy from the apparatus (110) for charging the handheld computing device and the handheld computing device (FIG. 1, 120). Different combinations of different types of energy are also contemplated.

The communication module (116) may use Bluetooth™ wireless technology to communicate with the handheld computing device (FIG. 1, 120). The communication module (116) may receive audio output from the handheld computing device (FIG. 1, 120) to relay to the data port (113).

The power storage (115) may be a battery that stores between 500 to 200,000 mA hours of electricity, with a preferred value of 3000 mA hours of electricity sufficient to charge the handheld computing device (FIG. 1, 120) one time.

The photovoltaic power source (114) may provide electrical energy to the power storage (115) and may allow the power storage to be recharged without plugging the apparatus (110) into a different electrical power source.

The data port (113) may be an auxiliary headphone jack (FIG. 1, 112) to provide audio output to a personal headset.

Figure 3:
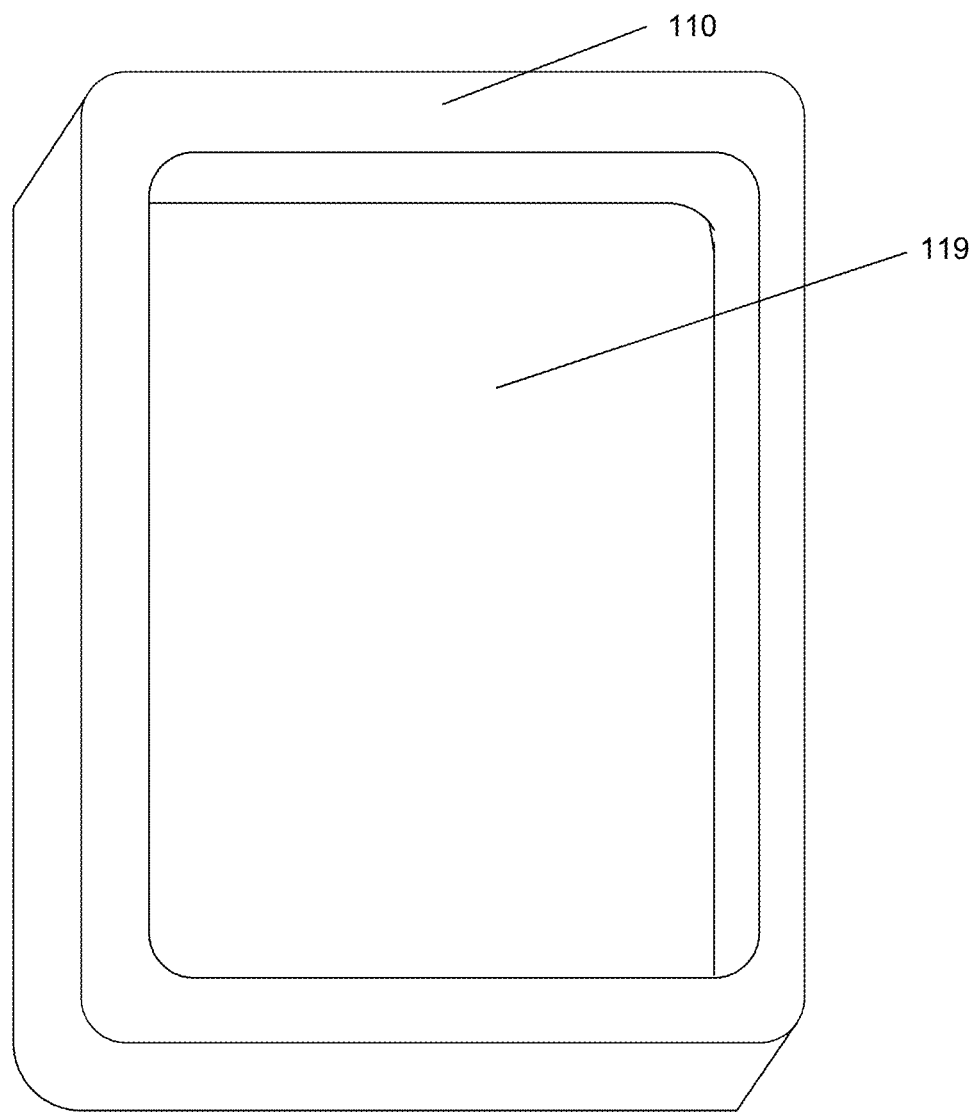
FIG. 3 illustrates a front view of an apparatus for charging a handheld computing device.

FIG. 3 illustrates a front view of an apparatus (110) for charging a handheld computing device (FIG. 1, 120). The apparatus (110) may be formed to shape a cavity (119) to receive the handheld computing device. The cavity (119) may vary from one device to another. The cavity may be lined with material to reduce mechanical shocks to the device. The material used to line the cavity may include rubber or foam to reduce damage to the handheld computing device (FIG. 1, 120). The cavity (119) may include grooves, notches, lips, or other mechanical means of retaining the handheld computing device (FIG. 1, 120).

Figure 4:
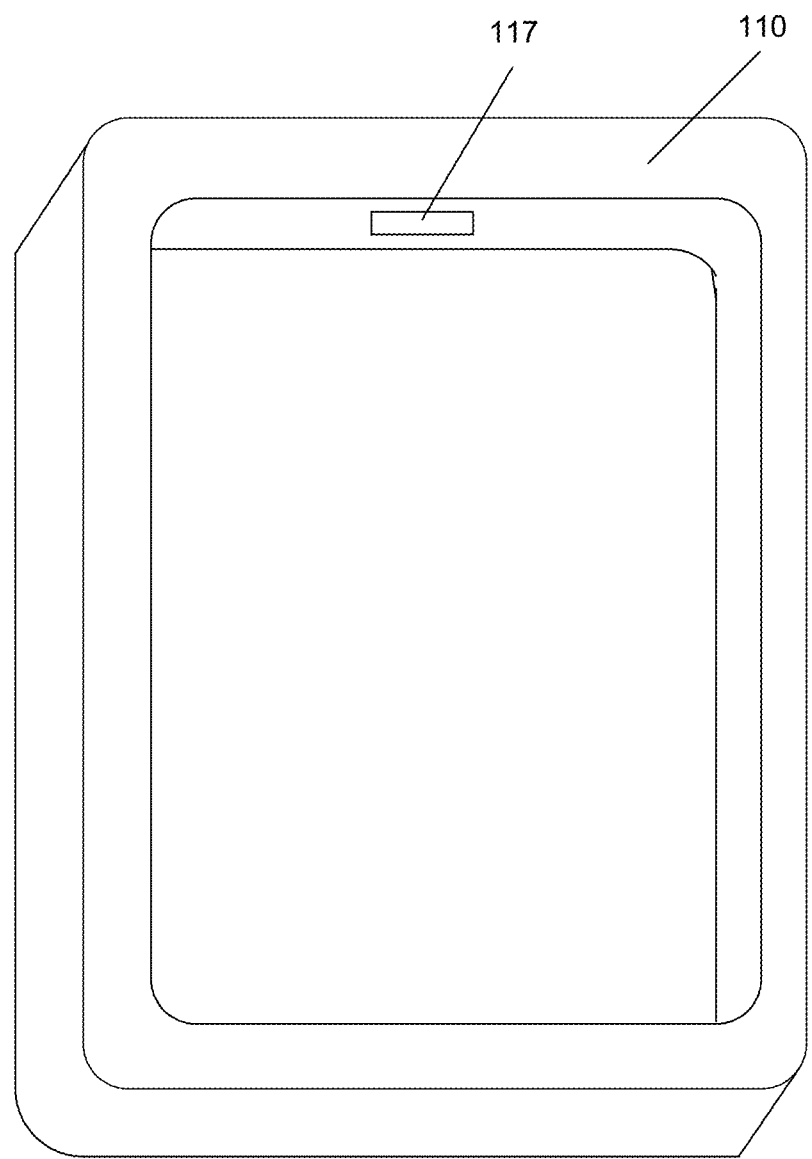
FIG. 4 illustrates a front view of an apparatus for charging a handheld computing device with a connector for charging a handheld computing device.

FIG. 4 illustrates a front view of an embodiment of an apparatus (110) for charging a handheld computing device (FIG. 1, 120). FIG. 4 shows an embodiment of a charging device (117) that provides a mechanical connection between the apparatus (110) and the handheld computing device (FIG. 1, 120). In this example, the charging device (117) may provide both electrical and mechanical connections between the apparatus (110) and the handheld computing device (FIG. 1, 120). The charging device (117) may also serve as a part of the communication module (FIG. 2, 116) to provide communication between the apparatus (110) and the handheld computing device (FIG. 1, 120).

Figure 5:
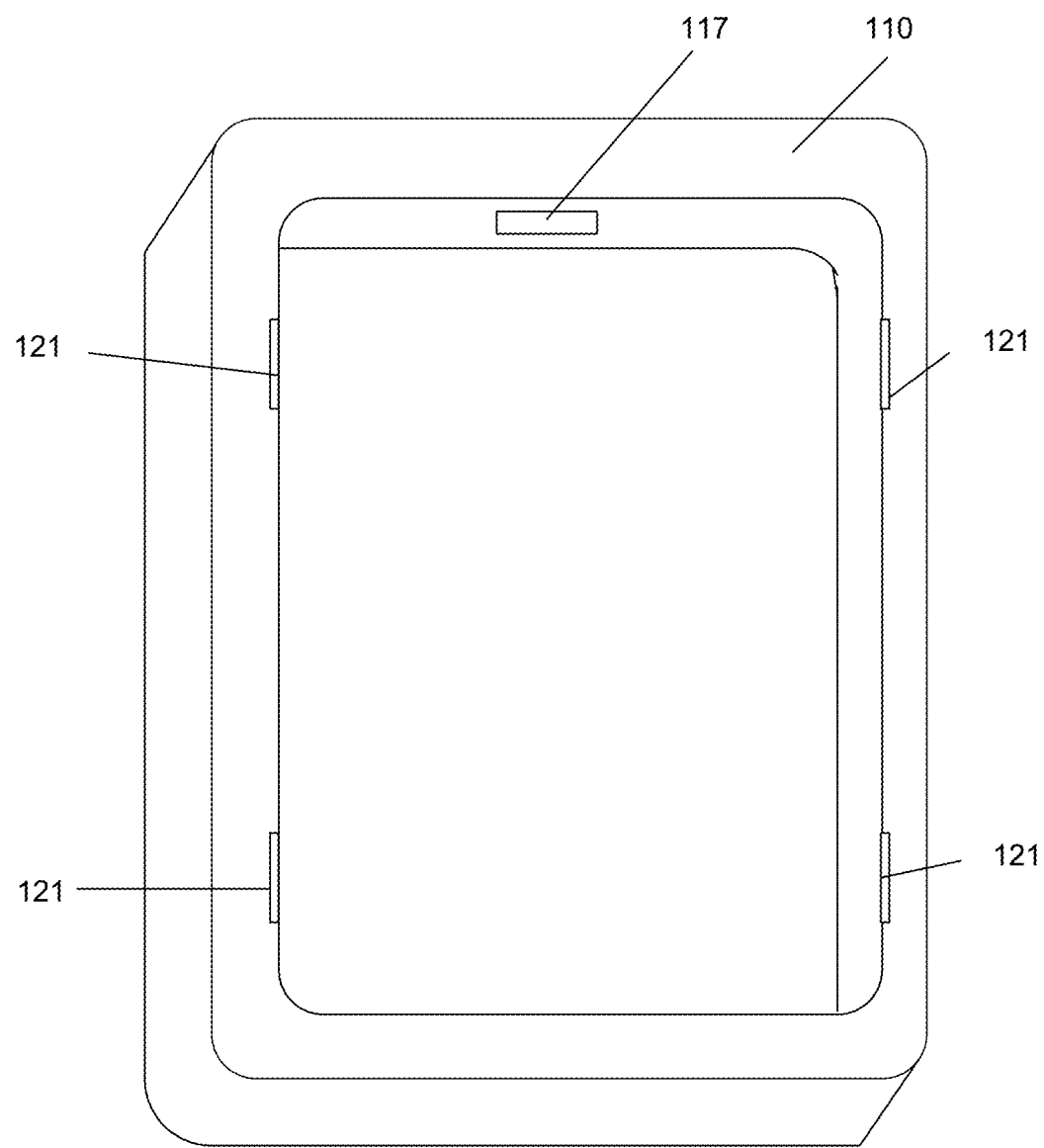
FIG. 5 illustrates a front view of an apparatus for charging a handheld computing device with a connector for charging a handheld computing device.

FIG. 5 illustrates a front view of an apparatus (110) for charging a handheld computing device (FIG. 1, 120), and the handheld computing device may including a number of clips (121) to retain the handheld computing device. Such clips (121) may provide additional security and restraint for the handheld computing device (FIG. 1, 120), to prevent its unintentional dislodgment from the apparatus (110) for charging the handheld computing device.

Figure 6:
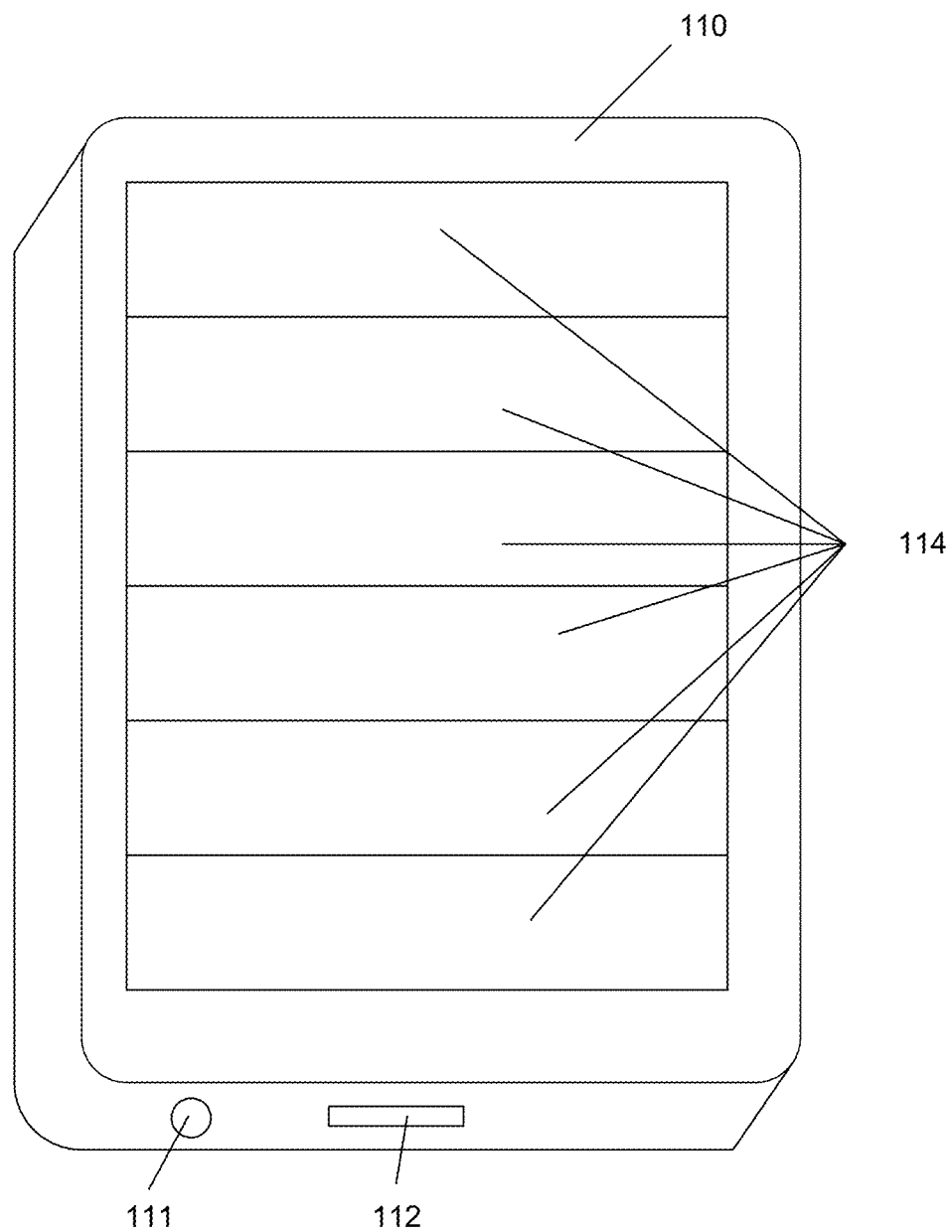
FIG. 6 illustrates a back view of an apparatus for charging a handheld computing device.

FIG. 6 illustrates a back view of an embodiment of apparatus (110) for charging a handheld computing device. In this view, a number of photovoltaic power sources (114) can be seen. The photovoltaic power sources (114) may provide electrical energy for the power storage (115). Exposure of the photovoltaic power sources (114) to light may causes the photovoltaic power sources (114) to generate electrical energy. The electrical energy may then be stored in the power storage (115), and may later be used by the charging device (117) to charge the handheld computing device (FIG. 1, 120).

Also shown are a number of data ports (FIG. 2, 113). In this example an auxiliary headphone jack (111) and a USB port (112) are illustrated.

Figure 7:
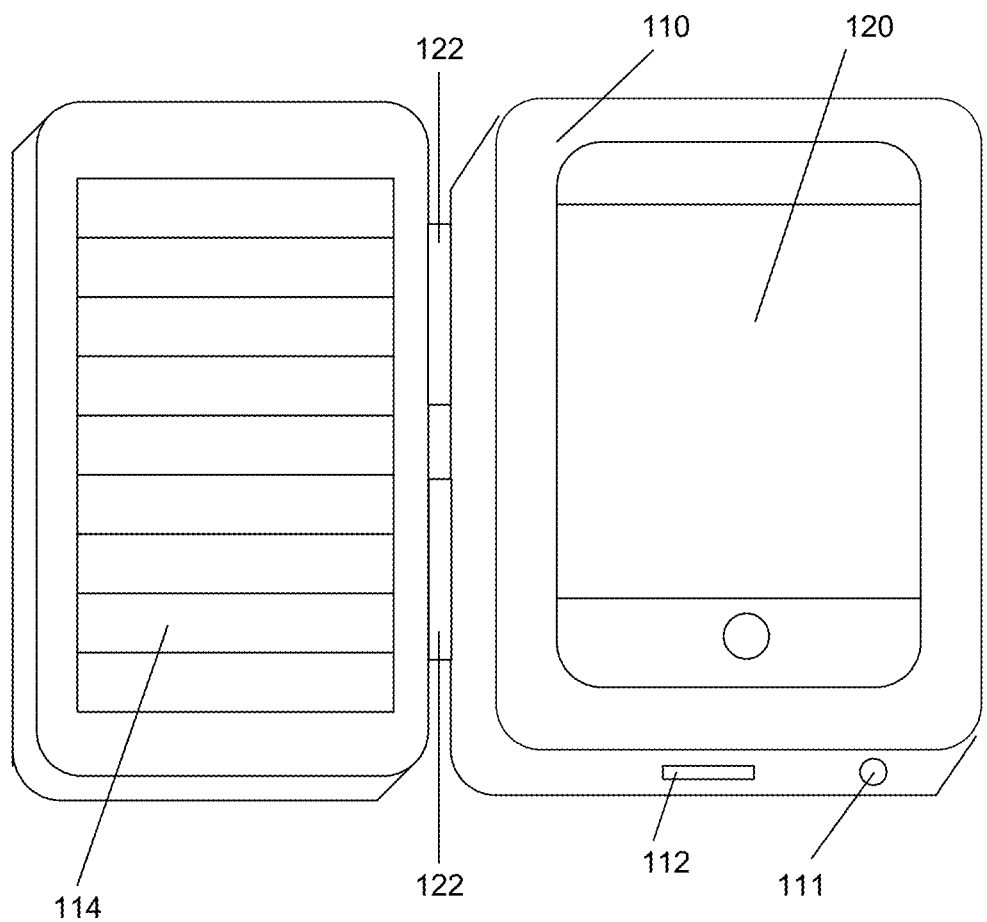
FIG. 7 illustrates a back view of an apparatus for charging a handheld computing device with a hinged photovoltaic power source.

FIG. 7 illustrates an embodiment of an apparatus (110) for charging a handheld computing device that may include a number of hinges (122) that may allow both the photovoltaic power source (114) and the handheld computing device (120) to face the same direction. In this manner, the handheld computing device (120) may be used while the photovoltaic power source (114) charges the power storage (115).

The inclusion of a number of hinges (122) may allow the photovoltaic power source (114) to be swiveled in order to be exposed to sunlight. The hinges (121) may further provide support for the handheld computing device (120) to enhance viewing of a display on the handheld computing device.

As illustrated, a USB port (112) and an auxiliary headphone jack (111) are shown.

Figure 8:
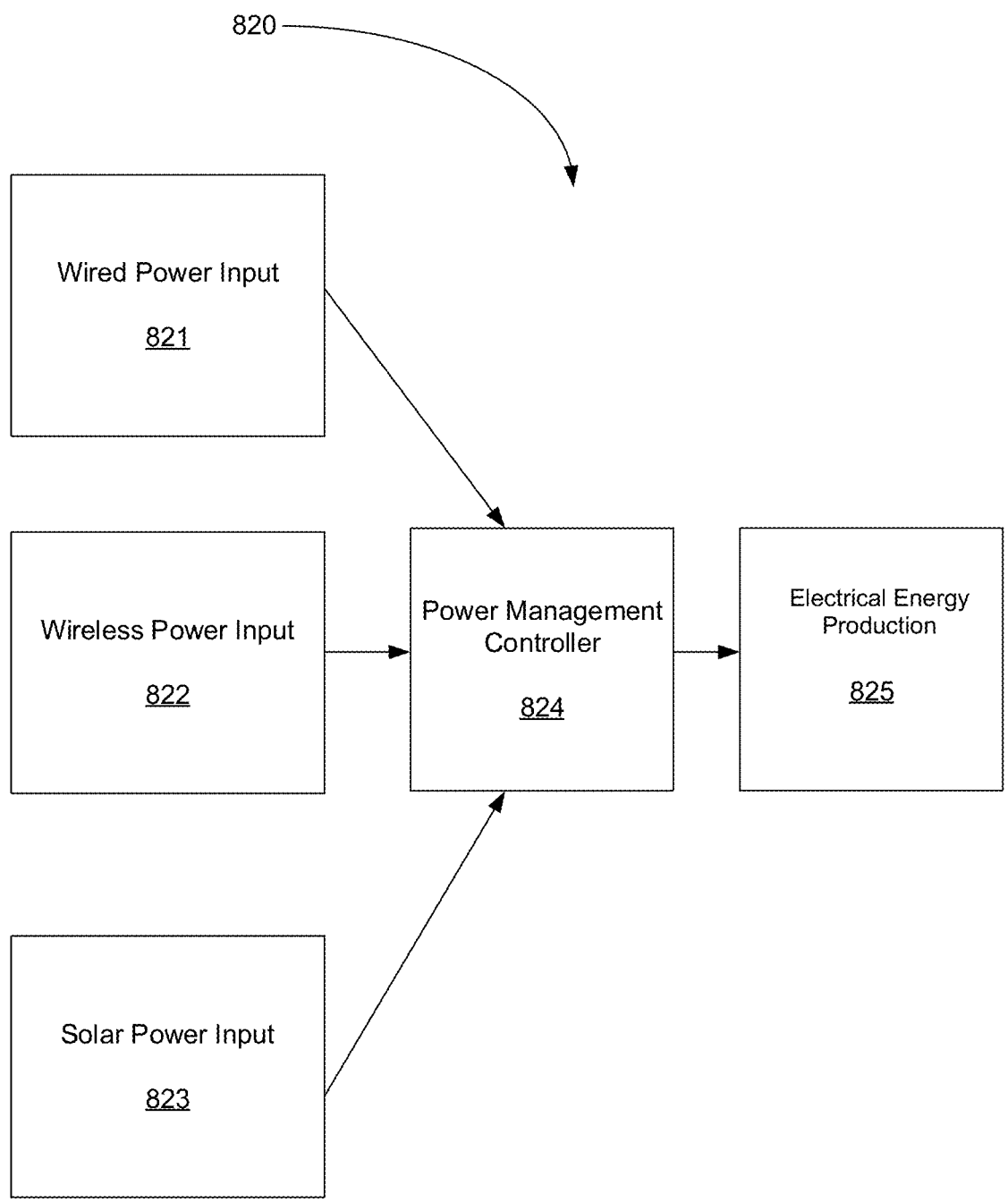
FIG. 8 illustrates a power management module to provide power to a handheld computing device.

FIG. 8 illustrates an embodiment of a power management module (820) to provide power to a handheld computing device. As illustrated, the power management module (820) may include a wired powered input (821), a wireless power input (822), and a solar power input (822) that are electrically connected to a power management controller (824). The power management controller (824) may provide electrical power as electrical energy production (825) from the power sources associated with the apparatus.

The wired power input (821) may provide power from a wired source, such as a firewire, Universal Serial Bus (USB)-C, a micro-USB, a mini-USB, or other wired power source. The wired power source may receive electrical energy from an external power supply, such as an external battery or an Alternating Current (AC) Charger.

The wireless power input (822) may provide power from a wireless power source, such as an inductive charging mat or station. An inductive charging system refers to an inductive charging mat or inductive charging station. The wireless power input (822) may receive electrical energy through a source that does not require a physical connection.

The solar power input (823) may use photovoltaic solar cells to produce electrical energy from light sources.

Alternatives sources of power generation may be used as they become available, such as fuel cells, hydrogen cells, or any other method of generating electrical energy.

The power management control (824) may receive electrical energy from any of the sources, including but not limited to the wired power input (821), the wireless power input (822), the solar power input (823), or any other power source. The power management control may select a combination of power sources to power a handheld computing device. In one example, a power management controller may use all solar power input (823) to reduce the carbon footprint of a handheld computing device. In another example, the solar power input (823) may not generate sufficient electrical energy, so the power management controller (824) may use power from the wired power input (821). In yet another example, the solar power input (823) may not generate sufficient electrical energy, and the device may not receive any electrical power from the wired power input (821), so the power management controller (824) may use power from the wireless power input (822).

The power management controller (824) may create a supply of power for the power production (825) to charge, maintain, or aid in the operation of a handheld computing device.

Figure 9:
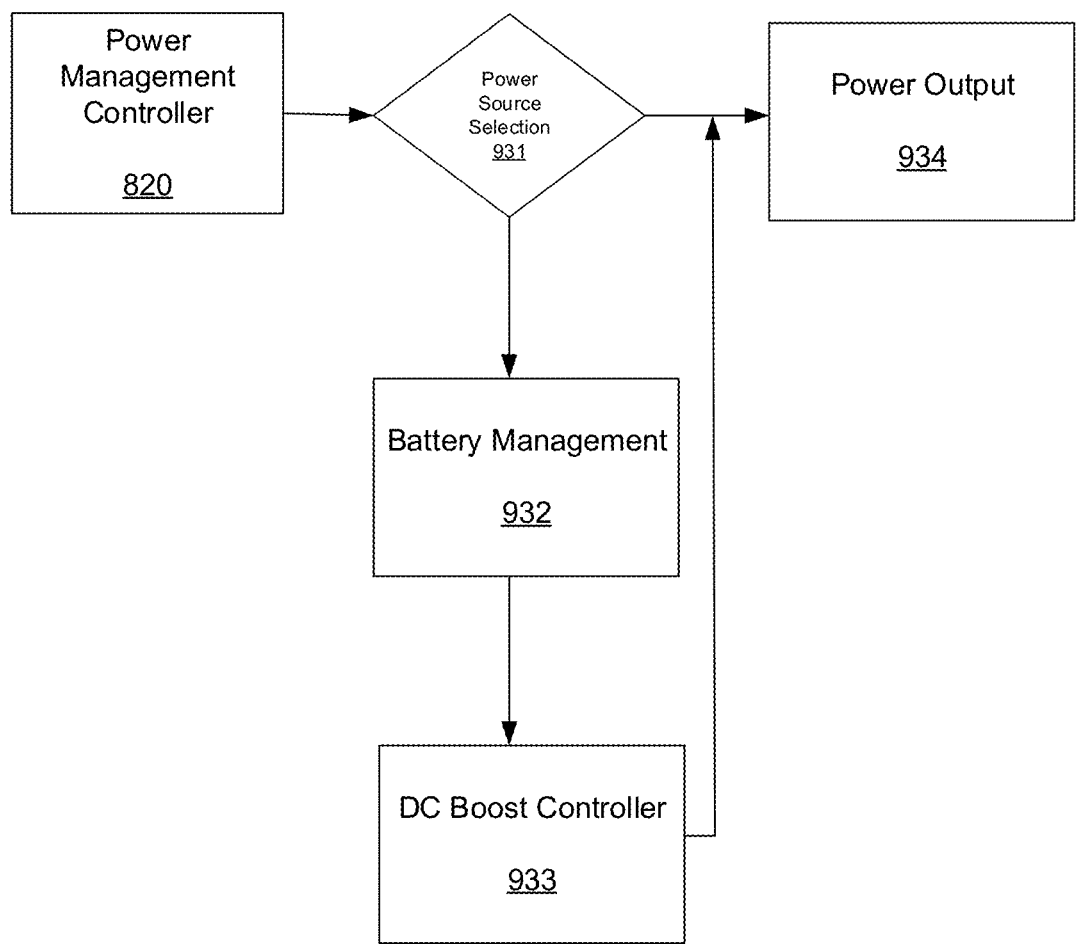
FIG. 9 illustrates a power management module managing power between a battery and power output to a handheld computing device.

FIG. 9 illustrates an exemplary power management module managing power between a battery and power output to a handheld computing device. In this example, the power management controller (820) charges an electrical storage device, such as a battery, to provide a direct current power source for the handheld computing device.

The power management controller (820) may provide a source of power to a power source selection (931). The power source selection (931) may provide power to a battery management (932) to provide electrical energy to be stored in a battery as part of the device (FIG. 1, 100).

The battery management (932) may provide electrical energy to a DC boost controller (933). The DC boost controller (933) may boost aspects of a direct current (DC) power source to meet the specifications of a handheld computing device. For example, the DC boost controller (833) may alter the voltage of a battery source to meet the specifications of the power output (934).

The power source selection (931) may select or combine energy from the power management controller and the DC boost controller to the power output (934.

Figure 10:
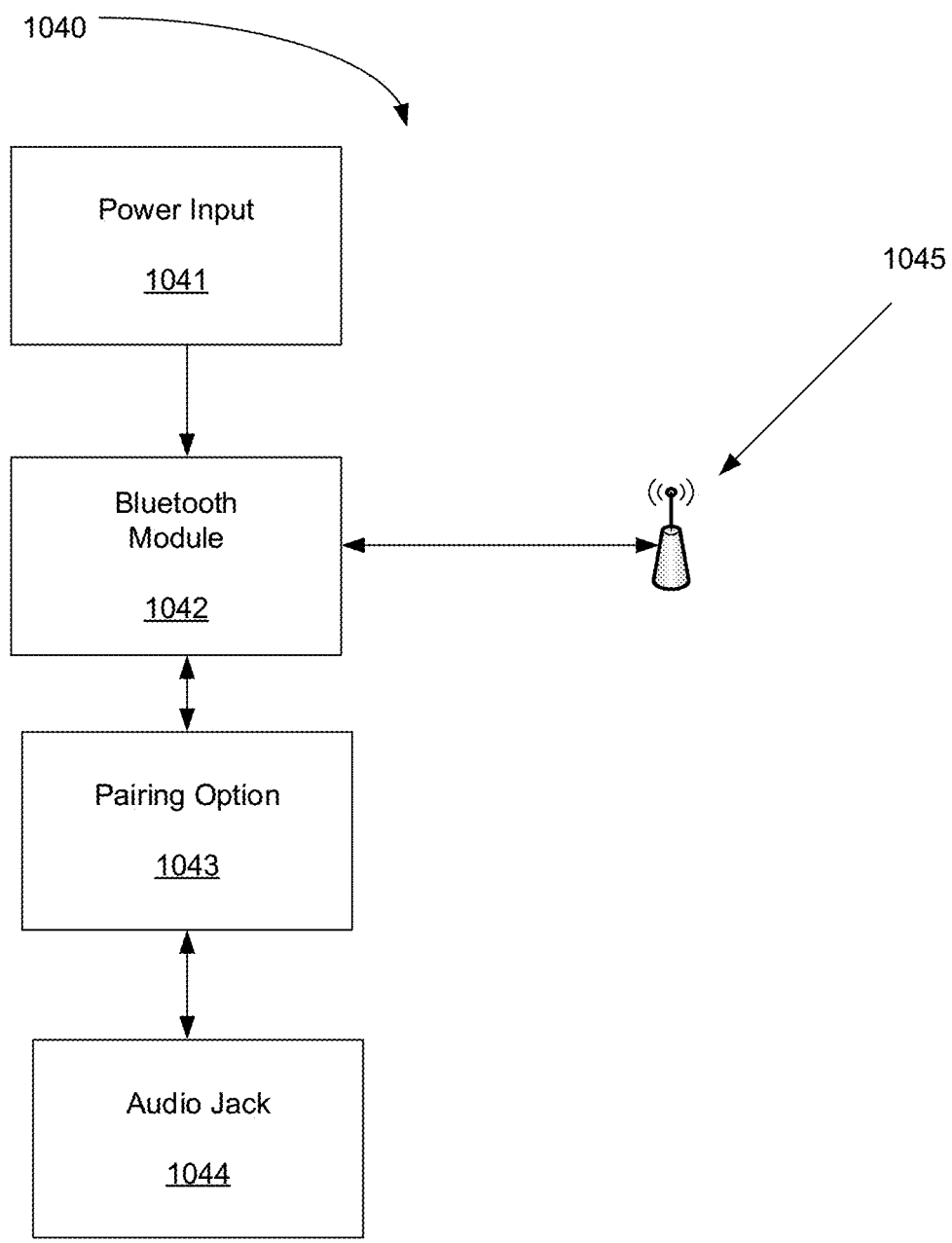
FIG. 10 illustrates a Bluetooth control system to power wireless communication between an audio jack and a handheld computing device.

FIG. 10 illustrates an exemplary Bluetooth control system (1040) configured to power wireless communication between an audio jack and a handheld computing device.

The Bluetooth control system (1040) may include a power input (1041), a Bluetooth module (1042), a pairing option (1043), an audio jack (1044) and a Bluetooth antennae. While this example uses Bluetooth technology, other wireless technologies that are used by handheld computing devices may be used.

The power input (1041) may provide a power source to operate the Bluetooth module (1042). The power input (1041) may be a power management module (FIG. 8, 820) that uses combination of wired power input (FIG. 8, 821), wireless power input (FIG. 8, 822), solar power input (FIG. 8, 823) or other power sources to power the Bluetooth module (1042).

The Bluetooth module (1042) may communicate with a pairing option (1043) may provide input as to information needed for the Bluetooth module (1042) to communicate a handheld computing device. The Bluetooth module (1042) may use an antennae (1045) to communicate with a handheld computing device.

The Bluetooth module (1042) may receive input from and provide output to an audio jack (1044). The audio jack (1044) may be a Universal Serial Bus (USB), or may be an audio port such as a 3.5 mm headphone jack. The Bluetooth module may receive information from and provide information to the audio jack (1044).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

The invention claimed is:

1. An apparatus for charging a handheld computing device, the apparatus comprising:
   a case, the case being sized to hold a handheld computing device;
   a power storage device, the power storage device mechanically connected to the case;
   a photovoltaic power source, the photovoltaic power source mechanically connected to the case and electrically connected to the power storage device;
   a charging device, the charging device electrically connected to the power storage device, the charging device charging the handheld computing device;
   a communication module, the communication module communicating with the handheld computing device;
   a data connection port, the data connection port providing data access for the handheld computing device using the communication module;
   a power management module, the power management module comprising:
   a power source selection, the power source selection indicating when electrical energy is provided by the power management module and a battery management;
   a battery management, the battery management managing storage and usage of electrical energy from a number of batteries; and,
   a direct current boost controller, the direct current boost controller providing control of a direct current power supply sufficient to remain within power output specifications.

2. The apparatus of claim 1, further comprising a number of batteries.

3. The apparatus of claim 1, further comprising a Bluetooth™ control system, the Bluetooth ™ control system comprising:
   a power input, the power input providing electrical energy for the Bluetooth™ control system;
   an audio check, the audio check providing electrical communication between the apparatus and an external device;
   a Bluetooth™ module, the Bluetooth™ module providing communication between the audio jack and the hand held communication device using wireless communication at least one protocol;
   a pairing option, the pairing option providing communication to establish a link between the apparatus and the handheld computing device; and,
   an antennae, the Bluetooth™ module communicatively coupling, via the antennae, the apparatus to the handheld computing device.

\* \* \* \* \*